United States Patent [19]

Mandal et al.

[11] Patent Number: 5,761,416
[45] Date of Patent: Jun. 2, 1998

[54] METHOD AND APPARATUS FOR DISTRIBUTING NETWORK BANDWIDTH ON A VIDEO SERVER FOR TRANSMISSION OF BIT STREAMS ACROSS MULTIPLE NETWORK INTERFACES CONNECTED TO A SINGLE INTERNET PROTOCOL (IP) NETWORK

[75] Inventors: Kallol Mandal, Fremont; Steven Kleiman, Los Altos, both of Calif.

[73] Assignee: Sun Microsystems, Inc., Mountain View, Calif.

[21] Appl. No.: 773,442

[22] Filed: Dec. 27, 1996

Related U.S. Application Data

[63] Continuation of Ser. No. 572,648, Dec. 14, 1995, Pat. No. 5,633,810.

[51] Int. Cl.[6] .................................................. H04Q 9/00
[52] U.S. Cl. ........................... 395/200.8; 348/12; 348/13
[58] Field of Search ......................... 395/200.8, 200.47, 395/200.49, 200.6; 345/329, 335; 348/12, 13, 17

[56] References Cited

U.S. PATENT DOCUMENTS

| | | |
|---|---|---|
| 4,922,486 | 5/1990 | Lidinsky et al. .................. 370/60 |
| 5,446,735 | 8/1995 | Tobagi et al. .................. 370/85.3 |

*Primary Examiner*—James P. Trammell
*Assistant Examiner*—Thomas Peeso
*Attorney, Agent, or Firm*—Steven F. Caserza; Flehr Hohbach Test Albritton & Herbert

[57] ABSTRACT

A novel video server is taught which allows for additional output bandwidth from the server by using multiple physical network interfaces over a single IP subnetwork. This approach is particularly well suited for use with video servers that store and deliver multimedia bit streams by allowing all clients to share the same subnetwork with the server. In this manner, the bandwidth from each of the physical network interface can be combined as needed and assigned as needed in service to any plurality of destinations in the network, allowing all bandwidth to be available for use with one or more clients.

28 Claims, 7 Drawing Sheets

METHOD AND APPARATUS FOR DISTRIBUTING NETWORK BANDWIDTH ON A VIDEO SERVER FOR TRANSMISSION OF BIT STREAMS ACROSS MULTIPLE NETWORK INTERFACES CONNECTED TO A SINGLE INTERNET PROTOCOL (IP) NETWORK

This is a continuation of application Ser. No. 08/572,648 filed Dec. 14, 1995, now U.S. Pat. No. 5,633,810.

FIELD OF THE INVENTION

The present invention relates generally to video delivery systems used with video servers, and more specifically to methods and apparatus for transmission of video data over multiple network interfaces connected to the same Internet Protocol (IP) network.

BACKGROUND OF THE INVENTION

Video servers, including networked video servers, are known in the art. At the transmitting end, video servers include a library of multimedia (e.g. video and audio) sources, which typically consists of movies or other entertainment, often referred to as "titles". The video and audio that make up a title are stored as "bit streams" or simply referred to as "streams" on the video server. Video servers permit one or more users to select one or more of the movies for viewing. An admission arbitrator unit is provided to limit the number of users allowed to use the video server at any given time, to prevent overloading the network or disk storage subsystem. Such overload could cause movies to run too slowly or to move forward (or backward) in a jerky manner.

The video server includes magnetic storage hard disk drives on which recorded blocks from the video titles are magnetically stored. Titles might be any length, from a 30-second commercial to a two hour feature movie. For VHS-quality video streams, the delivery rate is typically 1.5 to 2 Mbit/second for MPEG-1 encoding; 4 Mbit/second for MPEG-2 encoding. Full resolution (CCR-601) video is typically recorded at a higher rate (4 to 8 Mbit/second); HDTV Grand Alliance systems allow rates of 10 to 45 Mbit/second. Thus, one MPEG-1 or MPEG-2 movie may require 1 GB to 8 GB of storage media, with a typical two-hour, VHS-quality movie consuming about 1.8 GB of disk space.

To sustain the throughput that is required for the timely delivery of video streams, you cannot store the bit stream for a single movie in a single hard disk unit, because a typical single hard disk drive can only output data at the rate of a few MBytes/second. To circumvent this bottleneck, it is common to store blocks of the movie (e.g., perhaps 0.5 second sequences) in multiple hard disk units. These blocks are then read out to a buffer, and communicated over the network. As these blocks are sent over the network, new blocks from the movie are read out from a set of hard disk units, hereinafter referred to as a disk array. At the receiving end, the blocks are decoded for user viewing on a video monitor, television receiver or the like.

The server delivers bit streams from the array of disks at a constant bit rate. The video server must assure that once a stream request is accepted, the stream is delivered at the specified constant bit rate until the stream ends or the server is told to stop.

Delivered video streams are independent in that they can each be stopped and started independently. Furthermore, these delivered bit streams may each contain different content (i.e. each being a different movie) or a plurality of delivered streams can be from the same content stream, such as a plurality of video streams containing video data from the same movie. Furthermore, the video streams from the same content need not be synchronized so that more than one viewer can be watching the same movie simultaneously, although one user started the movie at a different time from the other.

There are two general models used for video server systems. One is a so-called "pull" model, in which receiving devices request information from the video server, which then responds to these requests. In such "pull" type systems, there are inherently present controls to ensure that data is received on time and in a proper sequence even in the event of bit errors, since the receiving system is in essence in control of the video server and can re-request information or hold a request until a previous request has been properly received.

The other model for video servers is the "push" model, in which the video server receives an initial instruction to start a video stream, and thenceforth the video server "pushes" the video stream out at a constant bit rate with no dynamic flow control or error recovery protocol. In this "push" model of stream delivery, the server delivers video streams from the array of disks at a constant bit rate. The video server's requesting client must assume that once a stream request is accepted, the stream is delivered at the specified constant bit rate until the stream ends or the server is told to stop.

In the local area network (LAN) environment, the video server is connected to one high-speed 100BaseT subnetwork via one or more Fast Ethernet host adapters Digital video streams are sent to their destination(s) using LAN packets. Destination clients can access the video streams by connecting directly to one of the 100BaseT networks. Alternatively, the 100BaseT networks can be connected to an optional packetfiltering switch that routes to independent 10BaseT networks. This allows individual destination clients to connect to a 10BaseT network without affecting the aggregate bandwidth available.

Figure 2A:
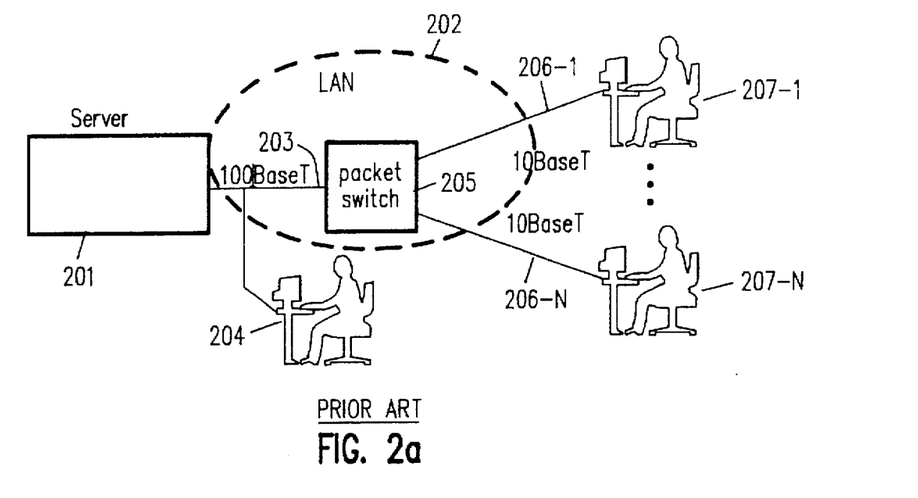
FIGS. 2a and 2b depict a typical prior art local area network.
Figure 2B:
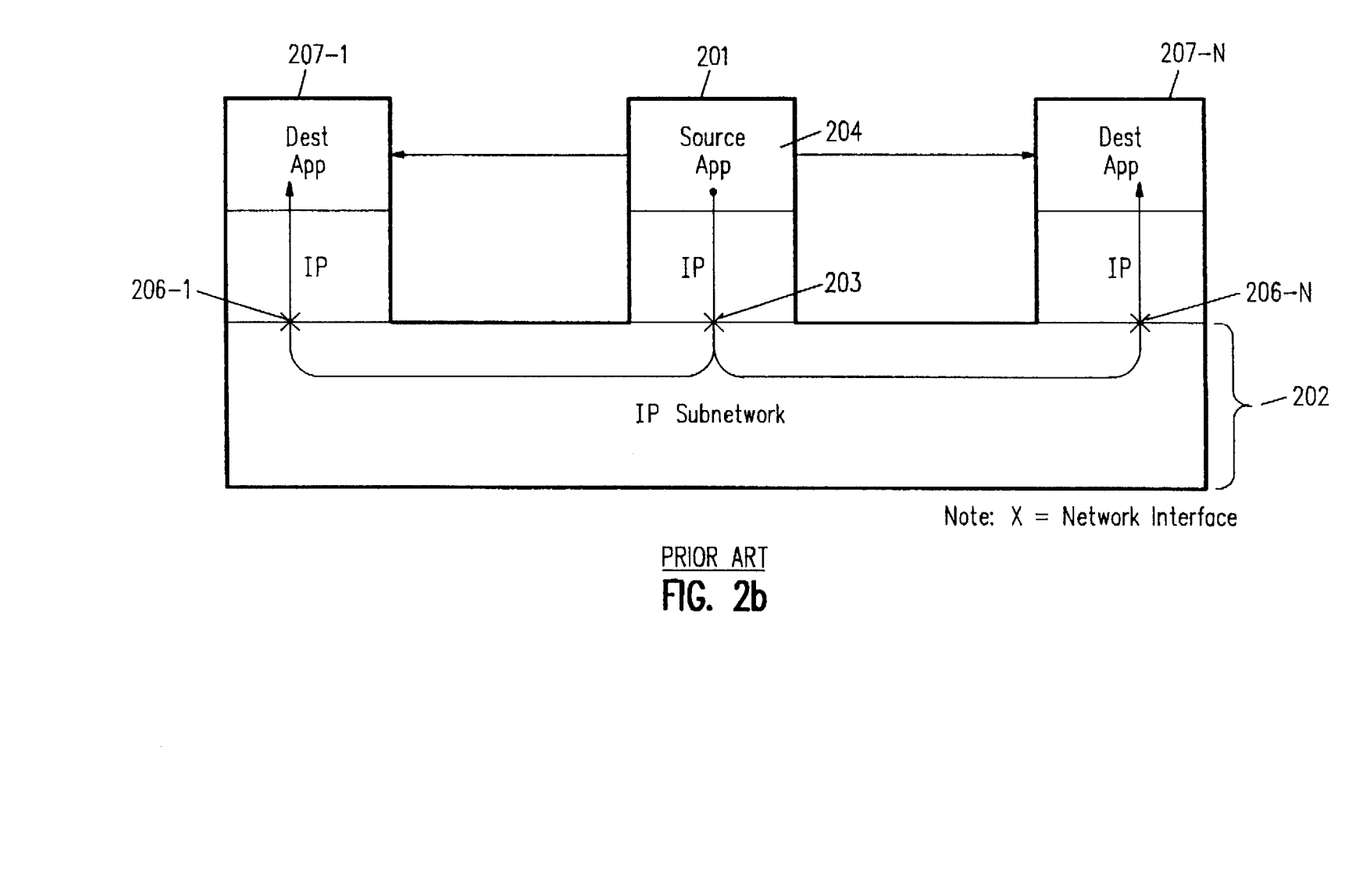

Typically, video servers use the Internet Protocol (IP) to transmit data to client computers on IP networks. Note that, for the present purposes, an IP network is considered to be equivalent to a LAN. For this purpose, a traditional server uses a single physical network interface over which the data is transmitted to one or more destination hosts that reside on the same IP subnetwork. As depicted in FIG. 2a, server 201 communicates via a link 203 to packet switch 205, and in turn to a plurality of users 207-1 through 207-N via links 206-1 through 206-N, respectively. If desired, a user 204 may be connected to server 201 by direct connection to link 203, for example to control the server application program. The various elements including link 203, packet switch 205, and connections 206-1 through 206-N are referred to as local area network (LAN) 202. Another way of looking at this prior art local area network is depicted in FIG. 2b, utilizing similar reference numbering. Server 201 is often running a source application (such as a video delivery system) 204 and is connected through the physical interface 203 to IP subnetwork 202, which is the local area network. Server 201 communicates through interface 203 and IP subnetwork 202 with destination applications 207-1 through 207-N through their respective physical interfaces 206-1 through 206-N. The limitation with this prior art approach is that the output bandwidth of the server is bounded by the bandwidth of the single network interface.

Figure 3A:
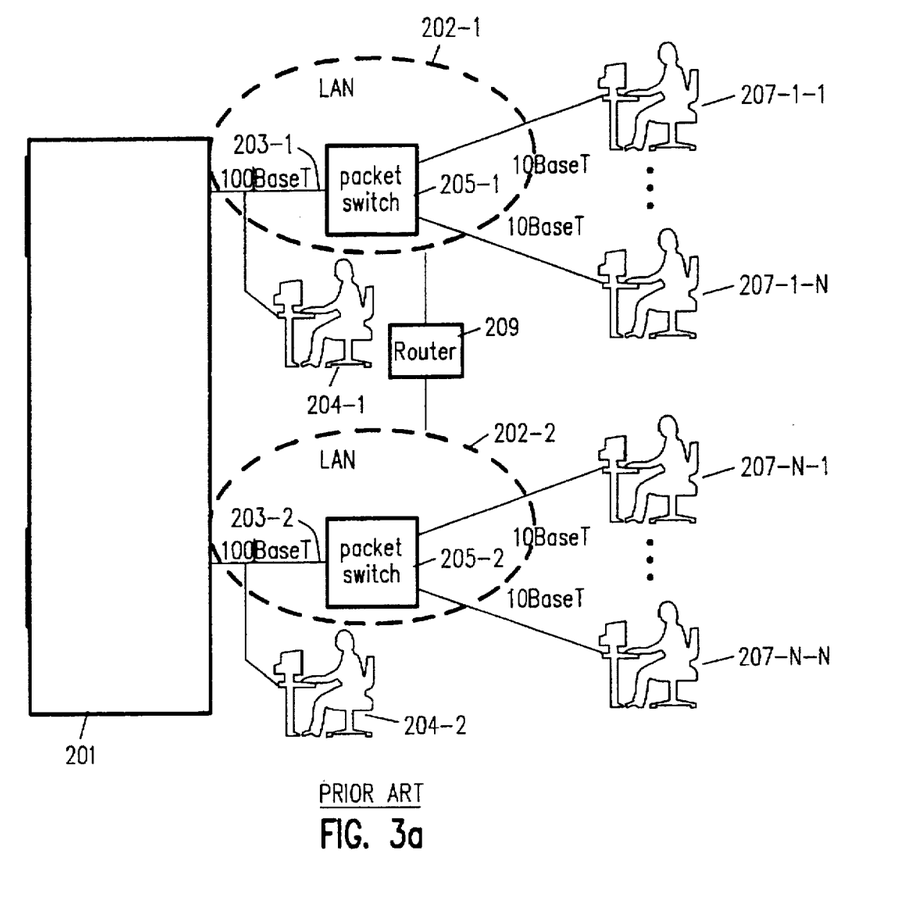
FIGS. 3a and 3b depict a typical prior art multiple local area network environment.
Figure 3B:
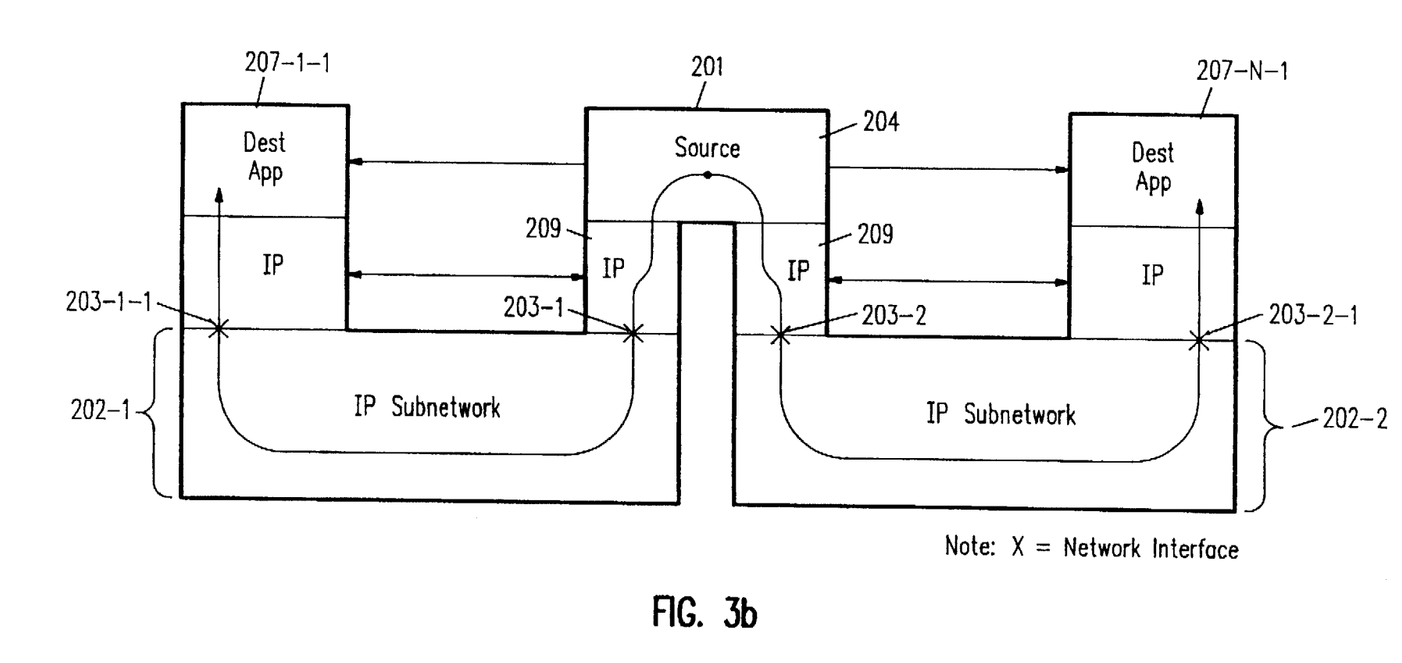

In the prior art, the only way to achieve full IP connectivity, for example, (referring to FIG. 3a) from user 207-1-1 to server 201 over connection 203-2, is to rely on an intervening router 209. Any direct communication among users 207-1-1 through 207-N-N would likewise rely on router 209. The conventional approach of achieving greater bandwidth by connecting additional physical interfaces 203-1 and 203-2 to different LANs 202-1 and 202-2 is shown in FIGS. 3a and 3b. The approach here is to configure additional physical network interfaces connected to distinct IP networks. The server is constrained to distribute additional output bandwidth over multiple IP subnetworks.

SUMMARY

In accordance with the teachings of this invention, a novel video server is taught which allows for additional output bandwidth from the server by using multiple physical network interfaces over a single IP subnetwork. This approach is particularly well suited for use with video servers that store and deliver multimedia bit streams by allowing all clients to share the same subnetwork with the server. In this manner, the bandwidth from each of the physical network interfaces can be combined as needed and assigned as needed in service to any plurality of destinations in the network, allowing all bandwidth to be available for use with one or more clients.

DETAILED DESCRIPTION OF EXEMPLARY EMBODIMENTS

Figure 1:
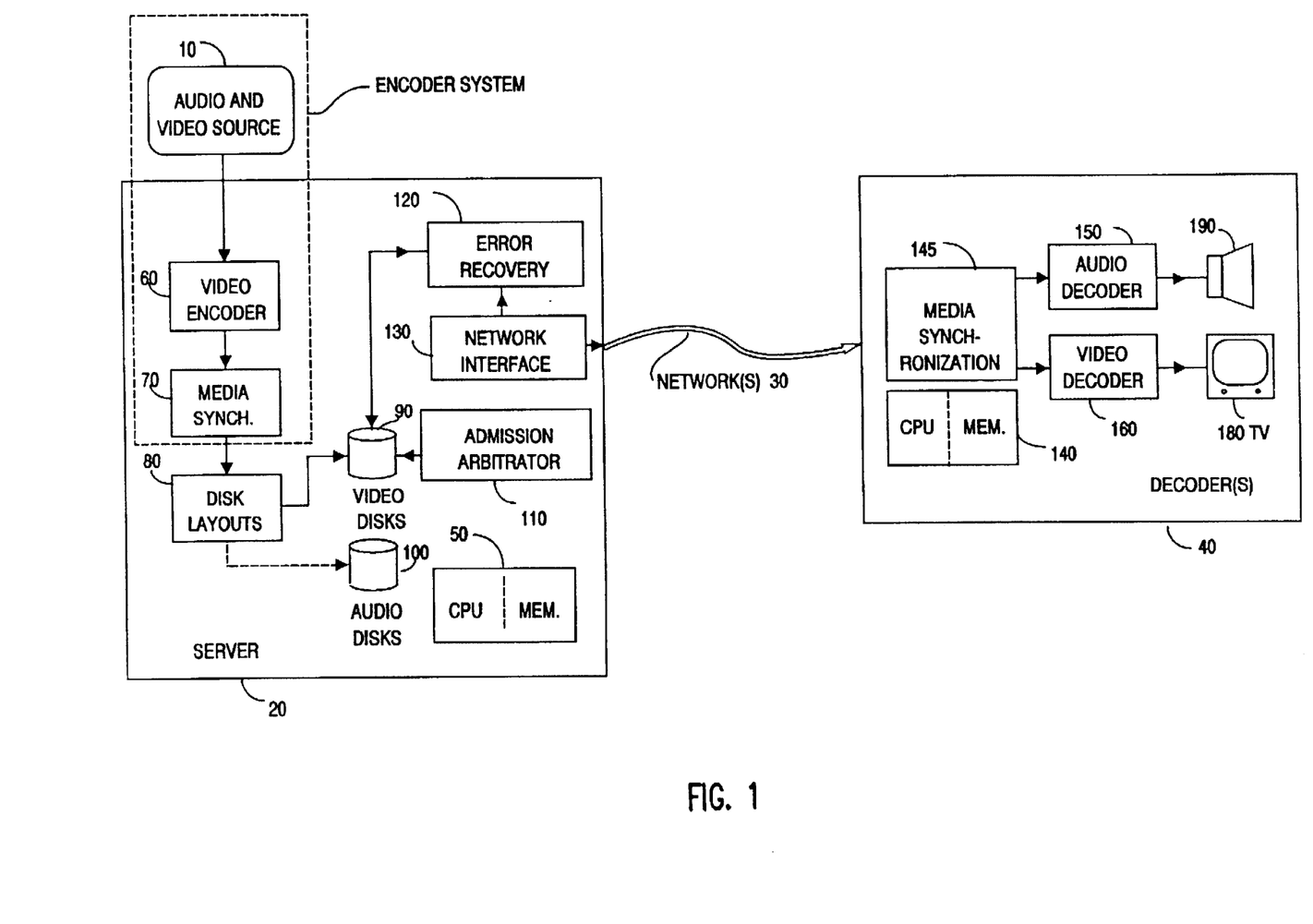
FIG. 1 depicts a network for distributing video which is suitable for video on demand client-server applications.

FIG. 1 depicts a video delivery system in which video is arranged for storage and distributed according to the present invention. Audio and video information source 10 is part of an encoding system which also includes video encoder 60 and media synchronizer 70 for synchronizing audio, video and text information. This encoding system provides processed output which is coupled over one or more networks 30 to one or more target clients or decoder systems 40. The network may be homogeneous with network transmission occurring through a so-called network cloud that carries a multicast of the encoded information stream, or transmission may be point-to-point. If heterogeneous, the networks can have widely varying bandwidth characteristics, ranging from as low as perhaps 64 Kbps for telephones, to 155 Mbps or more for ATM networks.

Server 20 includes central processor unit ("CPU") with associated memory, collectively 50. Server 20 further includes disk layout system 80 for arranging the information processed by encoder 60 onto video storage disk unit 90 (or other storage media). Storage 100 is also provided for signal processed audio information. The present invention may also be practiced in systems wherein video and audio information are stored in a common storage disk unit 90, using interleaving techniques, for example. In such systems, the separate storage unit 100 depicted in FIG. 1 is omitted.

Admission control mechanism 110 and communication error recovery mechanism 120 for handling bit errors or packet cell loss are also coupled to processed video storage 90. The server communicates with the heterogeneous network(s) through network interface 130, which interfaces with one or more network(s) 30 coupled to decoder system (s) 40, with each one of network 30 being coupled to one or more decoders 40.

At the receiving end, decoder system(s) 40 each include central processing unit ("CPU") 140 that includes a CPU per se and associated memory that may include cache memory. Decoder(s) 40 further includes a mechanism 145 for synchronizing audio and video information from the incoming embedded stream, as well as audio and video decoders 150, 160. The output from these decoders is coupled to sound generators, e.g., speakers 190, and to video displays, depicted as TV 180.

The system shown in FIG. 1 may be used in many applications. For example, a hotel may provide video on demand to a plurality of hotel rooms for guest viewing, or a cable company may provide video on demand to a plurality of subscribers.

If desired, the present invention 80 may be practiced with an end-to-end scalable video system that uses a scalable video encoder. Such a video encoder is disclosed in U.S. patent application Ser. No. 08/423,812 filed Apr. 18, 1995, now U.S. Pat. No. 5,621,660 entitled SOFTWARE-BASED ENCODER FOR A SOFTWARE-IMPLEMENTED END-TO-END SCALABLE VIDEO DELIVERY SYSTEM, and assigned to the assignee herein. A video decoder for decoding a scalably encoded video stream is disclosed in U.S. patent application Ser. No. 08/424,703, filed Apr. 18, 1995, entitled DECODER FOR A SOFTWARE-IMPLEMENTED END-TO-END SCALABLE VIDEO DELIVERY SYSTEM, and assigned to the assignee herein. Of course, the present invention may also be practiced with more conventional video display systems. If desired, the present invention may also employ a video disk system 90 and error recovery system 120 as disclosed in U.S. patent application Ser. No. 08/446,144, filed May 22, 1995, entitled SERVER DISK ERROR RECOVERY SYSTEM, and assigned to the assignee herein.

The availability of high end server computers which have one or more high performance CPUs and one or more high performance I/O busses creates a need for high bandwidth network interfaces when the server is configured to serve data over a network to client computers. Otherwise, the network interface becomes a bottleneck and the extra power of these servers is wasted. Video servers, which store and deliver isochronous bit streams, fall in this category. Isochronous bit streams are continuous streams of time-critical data, such as audio or video. A stream is an ordered sequence of bits that contains timing requirements for delivery.

In accordance with this invention, a method and structure is taught which allows for additional output bandwidth by using the IP protocol over the same IP subnetwork using multiple physical network interfaces, for a class of servers that serve video to clients. The approach is particularly well suited for use with video servers that store and deliver multimedia bit streams, as defined above. The teachings of this invention allow complete IP connectivity among the server and all clients without the need for a router, because all clients share the same subnetwork with the server.

Figure 4A:
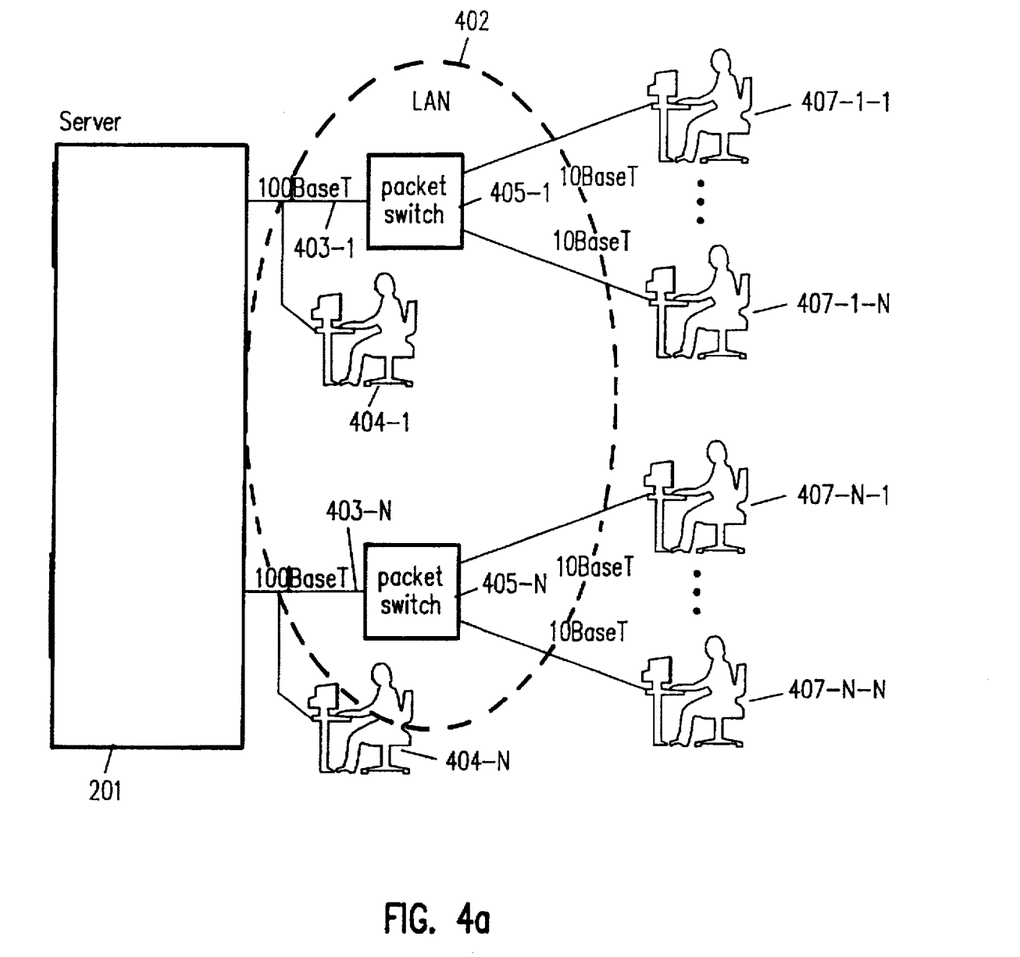
FIGS. 4a and 4b depict one embodiment of the novel local area network environment of the present invention.
Figure 4B:
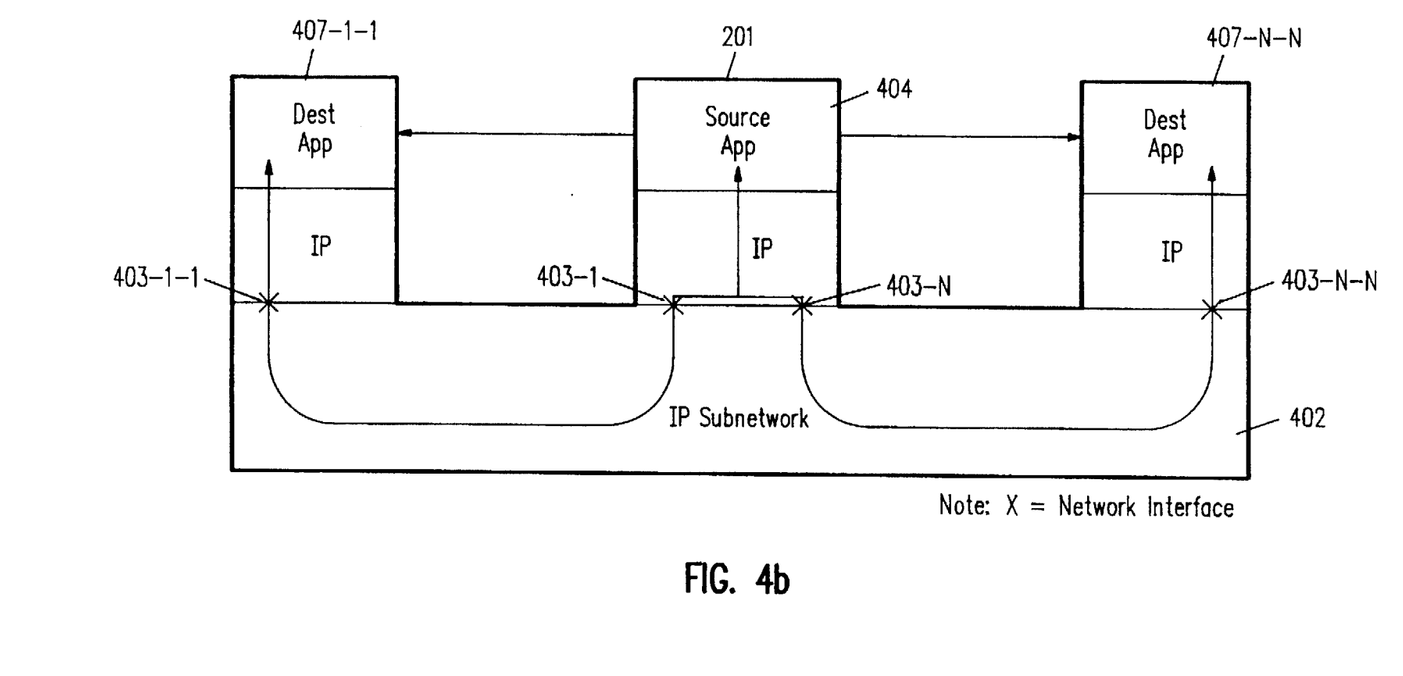

One embodiment of this invention is shown in FIGS. 4a and 4b. In one embodiment of this invention, additional bandwidth on server 201 is achieved using multiple physical network interfaces connected to the same IP network. The network load for data transmission is balanced across the multiple physical network interfaces transparently to higher level applications 407-1-1 through 407-N-N, such as an application that initiates the playing of video streams. The burden of the load balancing is performed by a layer 402 of software that is integral with the physical network interface. The data for destination IP clients on the same IP subnetwork is distributed across the multiple physical network interfaces 403-1 through 403-N associated with server 201 on a "session" granularity, where a session is defined to be a relationship that is set up between a particular client and the server by the higher level application. Furthermore, each session is defined to have at least one attribute that specifies the maximum amount of bandwidth that is required for all data transmission corresponding to the session.

Figure 5:
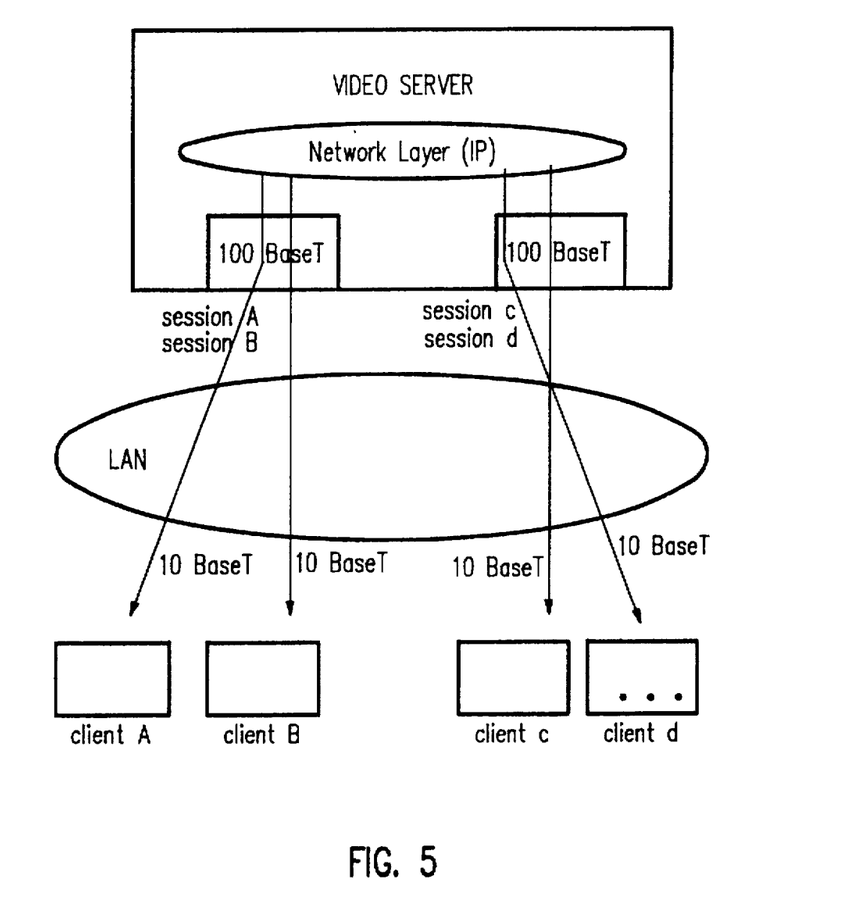
FIG. 5 depicts the distribution of server load on a session basis across multiple physical interfaces in accordance with the teachings of this invention.

In one embodiment of this invention, the selection of a particular physical interface 403-1 through 403-N for transmission of the data for a new session is based on which interface has currently has the least amount of load, thus enabling equal distribution of network load across all the physical network interfaces. This physical interface selection is completely transparent to a client application, since a single LAN 408 and corresponding software layer 402 are used in accordance with this invention. This aspect of this invention is depicted in FIG. 5.

Whereas ordinarily a computer on an IP network (including possibly multiple subnetworks) is limited in its output bandwidth to the maximum bandwidth supported over a single physical interface to a single IP subnetwork, in accordance with the teachings of the present invention a server is allowed to obtain additional output bandwidth by providing for multiple physical interfaces to the same IP subnetwork.

The only way for a server using the prior art to achieve the same output bandwidth would be for a system administrator to situate destination clients on distinct IP subnetworks, so that each additional network interface could connect to a different IP subnetwork. Using the prior art, multiple physical interfaces to IP subnetworks were supported only for routers, in which each physical interface connects to a different IP subnetwork, and multi-bound hosts, in which likewise, multiple physical interfaces connect to different subnetworks.

This invention treats multiple physical links as a single link which is used for video output only and can therefore use the same IP address as issued for the primary LAN interface on the server. Software layer 402 allocates communications channels for that one IP address to various ones of the physical links 403 transparently insofar as higher software layers are concerned.

This invention accomplishes what it does while remaining fully conformant to the IP standard, as specified for example in RFC 791 "Internet Protocol: DARPA Internet Program Protocol Specification", September 1981.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A media server system comprising:
    a media server;
    an interface protocol subnetwork; and
    a plurality of physical network interfaces coupled between said media server and said interface protocol subnetwork,
    wherein the bandwidth from each of said physical network interfaces coupled to said interface protocol subnetwork and associated with said server are combined as needed to provide a plurality of paths, each of a desired bandwidth.

2. A media server system as in claim 1 which further comprises one or more destination systems, each including a physical network interface coupled to said interface protocol subnetwork.

3. A media server system as in claim 2 wherein each of said paths is assigned as needed in service to any one of said plurality of said destination systems coupled to said interface protocol subnetwork.

4. A media server system as in claim 3 wherein said plurality of physical network interfaces associated with said media server are allocated to said destination systems on a session granularity, with each session including at least one attribute that specifies the maximum amount of bandwidth that is required for all data transmission corresponding to said session.

5. A media server system as in claim 1 wherein said physical network interfaces include control for assigning load between said plurality of physical network interfaces associated with said media server.

6. A media server system as in claim 1 wherein said plurality of physical network interfaces share a single assigned IP address.

7. A media server system as in claim 6 wherein a first control layer uses a single IP address and a second control layer allocates bandwidth requests with respect to said single IP address among said plurality of physical network interfaces.

8. A media server system comprising:
    one or more destination systems, each including a physical network interface; and
    an interface protocol subnetwork coupled to each of said physical network interfaces of said one or more destination systems.

9. A media server as in claim 8 which further comprises:
    a media server;
    a plurality of physical network interfaces coupled between said media server and said interface protocol subnetwork,
    wherein the bandwidth from each of said physical network interfaces coupled to said interface protocol subnetwork and associated with said server are combined as needed to provide a plurality of paths, each of a desired bandwidth.

10. A media server system as in claim 9 wherein each of said paths is assigned as needed in service to any one of said plurality of said destination systems coupled to said interface protocol subnetwork.

11. A media server system as in claim 10 wherein said plurality of physical network interfaces associated with said media server are allocated to said destination systems on a session granularity, with each session including at least one attribute that specifies the maximum amount of bandwidth that is required for all data transmission corresponding to said session.

12. A media server system as in claim 9 wherein said physical network interfaces coupled between said server and said interface protocol subnetwork include control for assigning load between said plurality of physical network interfaces associated with said media server.

13. A media server system as in claim 9 wherein said plurality of physical network interfaces share a single assigned IP address.

14. A media server system as in claim 13 wherein a first control layer uses a single IP address and a second control layer allocates bandwidth requests with respect to said single IP address among said plurality of physical network interfaces.

15. A method for operating a media server system comprising the steps of:

coupling a plurality of physical network interfaces between a media server and an interface protocol subnetwork; and combining as needed and assigning as needed the bandwidth from each of said physical network interfaces coupled to said interface protocol subnetwork and associated with said server to provide a plurality of paths, each of a desired bandwidth.

16. A method as in claim 15 which further comprises the step of coupling one or more destination systems, each utilizing a physical network interface coupled to said interface protocol subnetwork.

17. A method as in claim 16 wherein each of said paths is coupled to said interface protocol subnetwork in service to any one of said plurality of destination systems.

18. A method as in claim 16 which further comprises the step of allocating said plurality of physical network interfaces associated with said media server to said destination systems on a session granularity, with each session including at least one attribute that specifies the maximum amount of bandwidth that is required for all data transmission corresponding to said session.

19. A method as in claim 15 wherein said step of coupling a physical network interface includes assigning load between said plurality of physical network interfaces associated with said media server.

20. A method as in claim 15 wherein said plurality of physical network interfaces share a single assigned IP address.

21. A method as in claim 20 wherein a first control layer uses a single IP address and a second control layer allocates bandwidth requests with respect to said single IP address among said plurality of physical network interfaces.

22. A method for operating a media server system comprising the steps of:

coupling one or more destination systems, each utilizing a physical network interface coupled to an interface protocol subnetwork;

combining as needed and assigning as needed the bandwidth from each of said physical network interfaces coupled to said interface protocol subnetwork to provide a plurality of paths, each of a desired bandwidth.

23. A method as in claim 22 which further comprises the step of coupling a plurality of physical network interfaces between a media server and said interface protocol subnetwork.

24. A method as in claim 23 wherein each of said paths is coupled to said interface protocol subnetwork in service to any one of said plurality of destination systems.

25. A method as in claim 23 wherein said step of coupling a physical network interface includes assigning load between said plurality of physical network interfaces associated with said media server.

26. A method as in claim 23 which further comprises the step of allocating said plurality of physical network interfaces associated with said media server to said destination systems on a session granularity, with each session including at least one attribute that specifies the maximum amount of bandwidth that is required for all data transmission corresponding to said session.

27. A method as in claim 23 wherein said plurality of physical network interfaces share a single assigned IP address.

28. A method as in claim 27 wherein a first control layer uses a single IP address and a second control layer allocates bandwidth requests with respect to said single IP address among said plurality of physical network interfaces.

\* \* \* \* \*